Patented Apr. 28, 1942

2,280,997

UNITED STATES PATENT OFFICE 2,280,997

TREATMENT OF SALT-CUT AND LIME-CUT MUD

Robert B. Booth, Springdale, Conn., assignor to American Cyanamid Company, New York, N. Y., a corporation of Maine No Drawing. Application November 20, 1940, Serial No. 366,380

9 Claims. (Cl. 252—8.5)

This invention relates to a method of controlling the viscosity and water loss characteristics of aqueous mud and clay dispersions contaminated with inorganic salts such as sodium chloride or lime by the addition of dicyandiamide thereto, preferably in conjunction with the addition of organic or inorganic polyphosphates.

In the drilling of oil wells and other deep wells by rotary drilling processes it is now the practice to recirculate a fluid called "drilling mud" downwardly through the hollow drill pipe across the face of the drill bit and upwardly through the drill hole. The drilling mud serves to cool and lubricate the drill bit, to raise the drilling cuttings to the surface of the ground and to seal the sides of the well to prevent loss of water and drilling fluids into the formation through which the drill hole is being bored. After each passage through the well the mud is passed through a settling tank or trough, wherein the sand and drill cuttings are separated with or without screening after which the fluid is again pumped into the drill pipe by a mud pump.

A satisfactory drilling mud must possess certain definite characteristics. It must have sufficient fluidity to permit pumping at the proper rate without excessive power requirements and must be sufficiently thixotropic in character to prevent the settling of sand and cuttings in the well when the circulation is stopped temporarily for exchanging bits, fishing for tools or for other purposes. The two most important properties of rotary drilling muds are the property of density and the property of viscosity and shearing strength, which last property is controlled by the colloidal dispersion of the mud and its graduation of particle size. Viscosity and dispersion are usually considered simultaneously with density, the problem being to obtain adequate density, low viscosity and a permanent suspension of clay solids capable of supporting sand and cuttings within the well but which will release the sand and cuttings outside the well.

The viscosity in thixotropic mud may be measured by the Marsh funnel viscosimeter and the results are expressed as the number of seconds for a given volume to flow through an orifice of predetermined size. In muds of this character the measured viscosity depends to a considerable extent on movement or on the elapsed time since movement has ceased, as one of the chief contributing factors to this viscosity is the tendency of the mud to form a gel upon standing. This property of thixotropy or gelation upon standing has been described as resulting from the presence of a shell of surface hydration surrounding each clay particle and separating it from other clay particles similarly hydrated. The normal forces of attraction between the particles are opposed by forces of repulsion existing by virtue of these shells of surface hydration, with the result that relative movement between the clay particles is hindered and the mud has a high structural viscosity.

In my copending application Serial No. 338,241, filed May 31, 1940, I have shown that the addition of dicyandiamide to drilling muds results in an advantageous modification of their normal structural viscosities, and that even better results are obtainable when this compound is employed in conjunction with other conditioning and viscosity-reducing agents such as the water-soluble salts of polyphosphoric acids, including sodium tetraphosphate, tetrasodium pyrophosphate, sodium hexametaphosphate and the like.

I have now discovered that dicyandiamide can also be used with success in controlling the viscosity of drilling muds contaminated with inorganic salts such as the water-soluble salts of the alkali and alkaline earth metals. Contamination of this kind is known as salt- or lime-cutting, and occurs either because subterranean brines or limestone formations are encountered during the drilling or by solution of calcium hydroxide from the cement used in lining the well. Salt- and lime-cut muds are much harder to deflocculate than ordinary drilling mud, by reason of their high metallic ion content, and it is an advantage of dicyandiamide that it is an effective agent to improve the viscosity characteristics of this class of mud fluids.

An even more important feature of my invention resides in the employment of dicyandiamide in conjunction with other viscosity-reducing agents. By reason of the high metallic ion content of salt- and lime-cut muds, it is difficult to control their viscosity characteristics by the simple addition of such known deflocculating agents as the water-soluble salts of polyphosphoric acids, for the mud fluid soon begins to reflocculate or thicken after the addition of only relatively small quantities of these materials. I have found, however, and have demonstrated by the figures shown in the following examples, that the admixture of dicyandiamide with a viscosity reducing agent of this type will improve materially its action on salt- and lime-cut muds, so that the viscosity of the mud will remain at a lowered value during the entire drilling operation. This is one of the most important advantages of my invention.

Suitable deflocculating agents that may be used in admixture with dicyandiamide are, for example, such water-soluble salts and esters of polyphosphoric acids as sodium tetraphosphate, trisodium trioctyl tetraphosphate, tetrasodium pyrophosphate and tannic acid esters of polyphosphoric acids; water-soluble salts of metaphosphoric acids such as sodium metaphosphate, sodium hexametaphosphate and the like; the corresponding potassium salts; sodium or potassium silicate, tannic acid, humic acid, lignic acid, pyrogallic acid, waste sulfite liquor, soda black liquor or extract solutions or dispersions of the sap brown type, tannins and the like, and the urea and thiourea described and claimed in my copending application Serial No. 338,050, filed May 31, 1940.

A class of deflocculating agents that may be used with special advantage in admixture with dicyandiamide in the treatment of salt- and lime-cut drilling muds are the "saturated" alkali metal polyphosphates in which all the acid groups are neutralized or saturated with metallic or positive ions and in which the ratio of metal oxide ($Me_2O$) to $P_2O_5$ is greater than 1:1 but less than 2:1. This definition includes all the saturated alkali metal polyphosphates of the empirical formula $Me_{n+2}P_nO_{3n+1}$ in which Me is an alkali metal and $n$ is an integer greater than 2, and particularly a number of polyphosphate compositions obtained by fusion processes. The definition also includes mixed alkali metal polyphosphates as well as mixtures of two or more alkali metal polyphosphates of different chemical constitution. Typical phosphates of this class are saturated sodium and potassium triphosphates, in which the $Me_2O$ to $P_2O_5$ ratio is 5:3 and the alkali metal polyphosphates or phosphate mixtures prepared by fusing alkali metal ortho and pyrophosphates with phosphorus pentoxide in the proper proportions as described in the copending application of C. F. Bonnet and R. B. Booth, Serial No. 331,418, filed April 24, 1940. Other alkali metal polyphosphates falling within this definition are sodium and potassium hexaphosphate, sodium and potassium heptaphosphates $Me_9P_7O_{22}$, and sodium and potassium octaphosphates $Me_{10}P_8O_{25}$, as well as the corresponding mixed phosphates containing both sodium and potassium or other atoms or groups includes within the class of alkali metals forming stable complex phosphates. It will be noted that the above definition also includes sodium and potassium tetraphosphate, in which the ratio of $Me_2O$ to $P_2O_5$ is 3:2.

The invention in its broader aspects is not limited by the method used in incorporating the dicyandiamide with the salt- or lime-cut mud or clay dispersion, and any suitable method of incorporation may be used. In well drilling one method has been employed with success as to mix a solution of the dicyandiamide, which may or may not contain other viscosity-reducing agents as noted above, with the mud as it comes out of the well to facilitate the screening or settling out of sand and cuttings. In other cases the composition may be added just ahead of the mud pump so that the pumping operation will insure a thorough mixing. Still another method is to introduce a solution of the composition into the mechanical de-gelling mechanism, and other methods may be resorted to if desired. However, it should be noted that the remarkable property of dicyandiamide in deflocculating a mud fluid that has already been thickened by salt or lime or by the addition of excessive amounts of other viscosity-reducing agents renders these materials of especial value as addition agents to mud fluids that have already been used for some time, and in many cases the compounds may not be added until after the first few days of a drilling operation employing fresh drilling mud and other deflocculating agents.

In ordinary drilling practice the mud conditioning agents are added in amounts less than 0.4 pound per 42 gallon barrel of mud, and quantities of 1 pound per barrel are seldom exceeded in any single treatment. However, as continuous or intermittent additions may take place over considerable periods of time it is impossible to define the proper concentration in terms of the quantities added and this must be determined in the field. It should be understood, therefore, that the present invention includes the addition to mud or clay dispersions of dicyandiamide or compositions containing dicyandiamide in any amounts which, in the judgment of the operator, will give the proper viscosity that may be desired for the purpose in mind.

The invention will be illustrated in greater detail by the following specific examples. It should be understood, however, that although these examples may describe in detail some of the more specific aspects of the invention they are given primarily for purposes of illustration and the invention in its broader aspects is not limited thereto.

EXAMPLE 1

A mud fluid having a specific gravity of 1.35 was prepared from McKittrick clay, which is found in California and widely used in oil well drilling. This dispersion contained 23.3% solids and 76.7% water by volume, the specific gravity of the solids being 2.5. Additions were based on the water content only, and are expressed as "percent added" rather than percent content after the addition. Thus, for example, 1% NaCl=5.37 grs. on a 700 cc. mud sample.

Sodium chloride was added to 700 cc. of the mud as a contaminant and the sample was agitated for 30 minutes. In the columns showing the effect of dicyandiamide on the action of phosphates the dicyandiamide was then added and the sample was agitated 30 minutes more. The first phosphate addition was then made and the sample was agitated 5 minutes and immediately 500 cc. were poured through a screen into a Marsh funnel viscosimeter. The viscosity is expressed as the number of seconds required for the funnel to discharge.

In some cases, and particularly before and after the first addition of phosphate, the mud was too thick to run through the viscosimeter. The runs where this occurred are marked with an asterik. No control tests are shown for mud fluids containing 2% and 3% of NaCl but no dicyandiamide because the viscosity remained too high to measure, even after substantial amounts of phosphate were added.

*Table I*

| NaCl......percent.. | 1 | 1 | 1 | 1 |
|---|---|---|---|---|
| Dicy......do..... | 2 | 4 | 6 | 10 |
| Cumulative........ | STP | STP | STP | STP |
| Cum., lbs./bbl. | Marsh funnel viscosity (500/500) seconds | | | |
| 0 | (*) | (*) | (*) | (*) |
| 0.15 | (*) | (*) | (*) | (*) |
| 0.30 | (*) | (*) | 45.0 | 48.0 |
| 0.50 | 38.2 | 34.5 | 32.9 | 35.3 |
| 1.0 | 29.2 | 27.6 | 26.9 | 27.5 |
| 2.0 | 26.1 | 25.0 | 25.0 | 25.7 |
| 4.0 | 25.9 | 24.7 | 24.9 | 25.4 |
| 6.0 | 28.2 | 24.9 | 25.1 | 25.2 |
| 8.0 | 32.3 | 25.4 | 25.3 | 25.9 |
| 10.0 | 39.5 | 26.3 | 25.9 | 26.7 |
| 12.0 | 48.0 | 28.3 | 26.9 | 27.5 |
| 14.0 | | 31.6 | 28.9 | 29.7 |
| 18.0 | | 40.1 | 35.3 | 37.6 |
| 22.0 | | 52.3 | 43.8 | 50.5 |
| 26.0 | | | | 56.0 |

STP=Na₄P₄O₁₃. Dicy=dicyandiamide.
*Mud was too thick to run MFV.

EXAMPLE 2

Viscosity tests were made on 700 cc. samples of the mud of Example 1 to which 0.5 gr. of Ca(OH)₂ had been added, following the procedure outlined in Example 1. The results are shown in the following table.

| Ca⁺⁺, ppm........ | 500 | 500 | 500 | 500 | 500 |
|---|---|---|---|---|---|
| Dicy......percent.. | | 2 | 4 | 6 | 10 |
| Cumulative........ | Dicy | STP | STP | STP | STP |
| Cum., lbs./bbl. | Marsh funnel viscosity (500/500), seconds | | | | |
| 0 | 82.0 | 70.0 | 45.8 | 46.0 | 57.5 |
| 0.15 | 78.0 | 44.3 | 34.9 | 34.7 | 38.7 |
| 0.30 | 78.5 | 35.1 | 29.9 | 27.2 | 31.0 |
| 0.50 | 76.7 | 29.7 | 26.7 | 25.6 | 28.0 |
| 1.0 | 75.0 | 27.7 | 25.5 | 24.8 | 26.3 |
| 2.0 | 71.0 | 26.5 | 24.1 | 24.6 | 25.4 |
| 4.0 | | 26.2 | 23.8 | 24.4 | 25.3 |
| 6.0 | 58.3 | 25.7 | 24.1 | 24.2 | 25.1 |
| 8.0 | | 26.3 | 23.7 | 24.1 | 24.8 |
| 10.0 | 52.1 | 26.5 | 23.9 | 24.4 | 25.0 |
| 12.0 | | | | | |
| 14.0 | 53.5 | 29.9 | 24.6 | 24.8 | 25.9 |
| 18.0 | 55.0 | 46.5 | 25.7 | 25.1 | 27.1 |
| 22.0 | | | 28.4 | 26.7 | 31.4 |
| 26.0 | | | 34.0 | | |
| 30.0 | | | 40.4 | 32.6 | 49.5 |
| 34.0 | | | 45.0 | | |
| 38.0 | | | | 47.5 | 71.6 |

EXAMPLE 3

Instead of pretreating the mud as described in Example 1, mixtures of dicyandiamide and tetrasodium pyrophosphate were prepared and added. Viscosity determinations were made after each addition and were as follows:

| Contamination...... | 1% NaCl | 1% NaCl | 500 ppm, Ca⁺⁺ |
|---|---|---|---|
| Cumulative test with........ | 75% dicy 25% TSPP | 50% dicy 50% TSPP | 75% dicy 25% TSPP |
| Cum., lbs./bbl. | Marsh funnel viscosity (500/500), seconds | | |
| 0 | (*) | (*) | 77.8 |
| 0.15 | (*) | (*) | 57.0 |
| 0.3 | (*) | (*) | 40.3 |
| 0.5 | (*) | 36.0 | 31.1 |
| 1.0 | 53.8 | 35.0 | 27.6 |
| 2.0 | 32.5 | 33.3 | 27.1 |
| 4.0 | 31.9 | 30.5 | 27.5 |
| 6.0 | 32.1 | 28.8 | 27.5 |
| 8.0 | 30.5 | 28.6 | 26.8 |
| 10.0 | 29.9 | 28.5 | 26.2 |
| 12.0 | 28.5 | | 26.0 |
| 14.0 | 28.1 | 27.9 | 25.5 |
| 18.0 | 27.9 | 27.5 | 25.8 |
| 22.0 | 27.7 | 27.7 | 25.8 |
| 26.0 | 28.1 | | 26.2 |
| 30.0 | 28.6 | 38.1 | 25.8 |
| 34.0 | 29.2 | | 26.2 |
| 38.0 | 30.0 | | 26.7 |
| 42.0 | | | |
| 46.0 | | | 36.1 |
| 54.0 | | | 49.6 |
| 62.0 | | | |
| 70.0 | | | |
| 78.0 | | | |
| 94.0 | | | |
| 110.0 | | | |
| 126.0 | | | |
| 158.0 | | | |

*Mud was too thick to run MFV.

What I claim is:

1. A method of controlling the viscosity of salt-cut and lime-cut drilling muds which comprises incorporating dicyandiamide therein.

2. A method of controlling the viscosity of salt-cut and lime-cut drilling muds which comprises incorporating dicyandiamide therein and also adding another viscosity-reducing agent.

3. A method of controlling the viscosity of salt-cut and lime-cut drilling muds which comprises incorporating dicyandiamide therein and also adding a water-soluble polyphosphate.

4. A method of controlling the viscosity of salt-cut and lime-cut drilling muds which comprises incorporating dicyandiamide therein and also adding a water-soluble salt of a polyphosphoric acid.

5. A method of controlling the viscosity of salt-cut and lime-cut drilling muds which comprises incorporating dicyandiamide therein and also adding an alkali-metal pyrophosphate.

6. A method of controlling the viscosity of salt-cut and lime-cut drilling muds which comprises incorporating dicyandiamide therein and also adding tetrasodium pyrophosphate.

7. A method of controlling the viscosity of salt-cut and lime-cut drilling muds which comprises incorporating dicyandiamide therein and also adding an alkali-metal tetraphosphate.

8. A method of controlling the viscosity of salt-cut and lime-cut drilling muds which comprises incorporating dicyandiamide therein and also adding a saturated alkali-metal polyphosphate having a ratio of alkali metal oxide to $P_2O_5$ greater than 1:1 and less than 2:1.

9. A method of controlling the viscosity of salt-cut and lime-cut drilling muds which comprises incorporating dicyandiamide therein and also adding a compound of the formula $Me_{n+2}P_nO_{3n+1}$ in which Me is an alkali metal and $n$ is an integer greater than 2.

ROBERT B. BOOTH.